US010830246B2

United States Patent
Song et al.

(10) Patent No.: US 10,830,246 B2
(45) Date of Patent: Nov. 10, 2020

(54) ELECTRONIC PUMP

(71) Applicant: Zhejiang Sanhua Automotive Components Co., Ltd., Zhejiang (CN)

(72) Inventors: Hongmin Song, Zhejiang (CN); Junchao Zhang, Zhejiang (CN); Wei Ye, Zhejiang (CN); Junfeng Bao, Zhejiang (CN)

(73) Assignee: Zhejiang Sanhua Automotive Components Co., Ltd., Zheijiang (CN)

( * ) Notice: Subject to any disclaimer, the term of this patent is extended or adjusted under 35 U.S.C. 154(b) by 170 days.

(21) Appl. No.: 16/215,250

(22) Filed: Dec. 10, 2018

(65) Prior Publication Data

US 2019/0107114 A1 Apr. 11, 2019

Related U.S. Application Data

(63) Continuation of application No. 15/140,256, filed on Apr. 27, 2016, now Pat. No. 10,302,092.

(30) Foreign Application Priority Data

Apr. 30, 2015 (CN) .......................... 2015 1 0218077

(51) Int. Cl.
*F04D 13/06* (2006.01)
*F04D 29/02* (2006.01)
(Continued)

(52) U.S. Cl.
CPC .............. *F04D 29/026* (2013.01); *F04D 1/00* (2013.01); *F04D 13/064* (2013.01);
(Continued)

(58) Field of Classification Search
CPC ............ F04D 25/0606; F04D 25/0613; F04D 25/064; F04D 13/0606; F04D 29/2222; F16B 2200/30; Y10T 403/7005
(Continued)

(56) References Cited

U.S. PATENT DOCUMENTS

| 2,284,847 A | * | 6/1942 | Raymond | .............. G03B 17/12 |
| | | | | 403/350 |
| 5,779,449 A | * | 7/1998 | Klein | .................. F04D 29/2222 |
| | | | | 29/453 |

(Continued)

FOREIGN PATENT DOCUMENTS

| CN | 104061169 A | 9/2014 |
| DE | 10 2008 008 290 A1 | 8/2009 |

(Continued)

OTHER PUBLICATIONS

First Office Action for Chinese Application No. 201510218077.0, dated Jan. 3, 2019.

(Continued)

*Primary Examiner* — Charles G Freay
*Assistant Examiner* — Thomas Fink
(74) *Attorney, Agent, or Firm* — Wolf, Greenfield & Sacks, P.C.

(57) ABSTRACT

An electronic pump is provided, which includes a rotor assembly. The rotor assembly includes an impeller and a rotor which are separately injection-molded respectively. The material for injection-molding the rotor includes a magnetic material, and the material for injection-molding the impeller does not include a magnetic material. The impeller includes a first fitting portion, the rotor includes a second fitting portion, the impeller and the rotor are cooperated by the first fitting portion and the second fitting portion, and the impeller and the rotor are fixed with respect to each other by a fixing device. In this way, the impeller and the rotor may be made respectively by different materials, and an ordinary plastic material may be employed for the impeller, which may reduce the cost of manufacturing material of the rotor assembly.

12 Claims, 12 Drawing Sheets

(51) Int. Cl.
| | |
|---|---|
| *H02K 1/27* | (2006.01) |
| *H02K 7/14* | (2006.01) |
| *H02K 7/08* | (2006.01) |
| *F04D 1/00* | (2006.01) |
| *F04D 29/043* | (2006.01) |
| *F04D 29/22* | (2006.01) |
| *F04D 29/42* | (2006.01) |
| *F04D 29/62* | (2006.01) |
| *H02K 5/128* | (2006.01) |

(52) U.S. Cl.
CPC ..... *F04D 13/0606* (2013.01); *F04D 13/0673* (2013.01); *F04D 13/0693* (2013.01); *F04D 29/043* (2013.01); *F04D 29/22* (2013.01); *F04D 29/426* (2013.01); *F04D 29/628* (2013.01); *H02K 1/2786* (2013.01); *H02K 7/085* (2013.01); *H02K 7/14* (2013.01); *F05D 2260/36* (2013.01); *F05D 2300/43* (2013.01); *H02K 5/128* (2013.01)

(58) Field of Classification Search
USPC .................................. 403/348–352
See application file for complete search history.

(56) References Cited

U.S. PATENT DOCUMENTS

| | | | | |
|---|---|---|---|---|
| 6,443,715 | B1* | 9/2002 | Mayleben | F04D 13/0646 415/206 |
| 6,524,083 | B2* | 2/2003 | Deai | F04D 13/064 417/370 |
| 7,474,024 | B2* | 1/2009 | Nakanishi | H05K 3/284 310/64 |
| 7,573,169 | B2* | 8/2009 | Ihle | H02K 1/2733 310/156.21 |
| 8,282,367 | B2* | 10/2012 | Ihle | F04D 29/5813 417/423.8 |
| 8,550,788 | B2* | 10/2013 | Oda | F04D 15/0094 416/241 A |
| 8,908,322 | B1 | 12/2014 | Cheong | |
| 10,118,674 | B1* | 11/2018 | Jeffrey | B60P 7/0823 |
| 2002/0122731 | A1* | 9/2002 | Marioni | F04D 13/06 417/352 |
| 2006/0177321 | A1* | 8/2006 | Edwards | F04D 29/026 417/420 |
| 2009/0062020 | A1* | 3/2009 | Edwards | F04D 13/021 464/89 |
| 2009/0246043 | A1* | 10/2009 | Otsubo | H02K 7/14 417/354 |
| 2015/0211523 | A1* | 7/2015 | Bernreuther | F04D 1/04 416/3 |
| 2016/0319828 | A1 | 11/2016 | Song et al. | |

FOREIGN PATENT DOCUMENTS

| | | |
|---|---|---|
| EP | 1 346 458 | 9/2003 |
| EP | 2 031 251 A2 | 3/2009 |
| KR | 2014-0087180 A | 7/2014 |

OTHER PUBLICATIONS

Extended European Search Report for European Application No. 16167500.4, dated Sep. 14, 2016.

European Office Communication for European Application No. 16167500.4, dated Mar. 14, 2018.

Beall, by Design, Part design 107 : Draft angles. Plastics Today. https://www.plasticstoday.com/injection-molding/design-part-design-107-draft-angles/8979129051490, 4 pages [dated Jan. 31, 2000; last accessed Aug. 27, 2018].

* cited by examiner

ELECTRONIC PUMP

CROSS-REFERENCE TO RELATED APPLICATIONS

The present application is a continuation application of U.S. patent application Ser. No. 15/140,256, filed on Apr. 27, 2016, which claims the benefit of priority to Chinese patent application No. 201510218077.0 titled "ROTOR ASSEMBLY AND ELECTRICALLY PUMP", filed with the Chinese State Intellectual Property Office on Apr. 30, 2015, the entire disclosures of which are incorporated herein by reference.

TECHNICAL FIELD

This application relates to a component of an automobile, and particularly to a component of an automobile heat management system.

BACKGROUND

In recent decades, automobile industry develops rapidly. An electronic pump has gradually replaced a conventional mechanical pump and is largely used in automobile heat management systems as performances of automobiles developing towards a safer, more reliable, more stable, fully-automatic and intelligent, and environmental friendly and energy saving trend. The electronic pump has advantages of no electromagnetic interference, being efficient and environmental friendly and capable of being adjusted continuously etc., which can meet the requirements of market well.

A stator assembly and a rotor assembly of an electronic pump are completely isolated by a partition, which avoids an issue of liquid leakage occurred in a conventional motor type brushless direct current pump. Currently, the rotor assembly of the electronic pump includes an impeller and a rotor, the rotor assembly is an integrally formed member, i.e., the impeller and the rotor are injection-molded by the same material, which wastes the magnetic material. Further, for the rotor assembly in the same series having different hydraulic characteristics, a new mold is required to be made to manufacture the whole rotor assembly, which is expensive and needs a long period of time.

Thus, it is necessary to improve the conventional electronic pump in order to address the above technical issues.

SUMMARY

An object of the present application is to provide an electronic pump, which is capable of reducing the production and manufacturing cost.

To achieve the above objects, a following technical solution is adopted in the present application. An electronic pump includes a first housing, a second housing, a rotor assembly, a stator assembly, a shaft and a printed circuit board. A pump chamber includes a space between the first housing and the second housing. The electronic pump further includes a partition, and the partition separates the pump chamber into a wet chamber and a dry chamber. The rotor assembly is arranged in the wet chamber, and the stator assembly and the printed circuit board are arranged in the dry chamber. The rotor assembly includes an impeller, a rotor and a fixing device. The impeller and the rotor are separately formed. The material of the impeller does not include a magnetic material, and the material of the rotor includes a magnetic material. The impeller and the rotor are relatively fixed by the fixing device. The impeller includes a blade, a first connecting portion and a second connecting portion. The blade, the first connecting portion and the second connecting portion are an integral structure. The rotor includes an end and a rotor side wall. The end is arranged at an end of the rotor side wall. The second connecting portion of the impeller includes a first fitting portion. The end of the rotor includes a second fitting portion, the impeller and the rotor are cooperated by the first fitting portion and the second fitting portion, and a cooperation of the rotor assembly includes the first fitting portion and the second fitting portion, and the impeller and the rotor are fixedly connected with respect to each other by the fixing device and the cooperation.

Compared with the conventional technology, the electronic pump according to the present application includes the rotor assembly, and the rotor assembly includes the impeller and the rotor. The impeller and the rotor are separately formed respectively, and the impeller and the rotor are fixed by the fixing device. In this way, the impeller and the rotor may be made respectively of different materials. A common material may be employed for the impeller, which may reduce the cost of manufacturing material of the rotor assembly. At the same time, the impeller may be made to be thin since no magnetic material is employed, which improves the hydraulic performance of the electronic pump. In the case that fixing devices are the same, the rotors in the same series may be matched with different impellers. Different impellers may vary hydraulic performance of the electronic pump, and different hydraulic performances may be achieved simply by replacing the impeller, which the expense for molds for the rotor assembly may be reduced. Furthermore, the cylindricity and the evenness of the thickness of the wall of the rotor which is separately molded are also easily ensured.

DETAILED DESCRIPTION

The present application is further described with reference to the drawings and embodiments.

Figure 1:
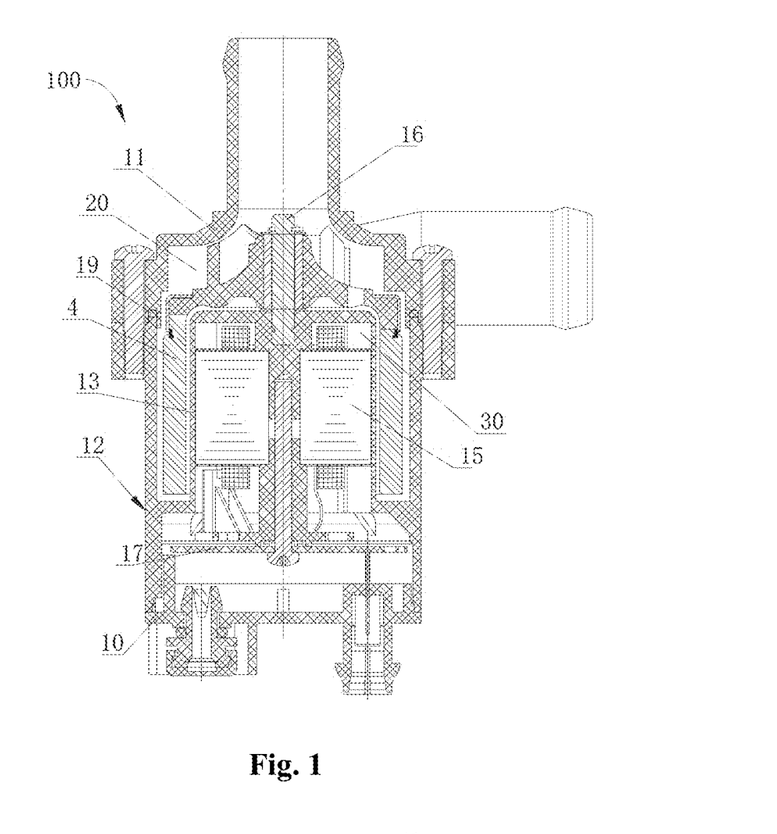
FIG. 1 is a sectional schematic view showing the structure of an embodiment of an electronic pump according to the present application.

Reference is made to FIG. 1. An electronic pump 100 includes a first housing 11, a second housing 12, an end cover 10, a rotor assembly 4, a stator assembly 15, a shaft 16 and a printed circuit board 17. A pump chamber includes a space among the first housing 11, the second housing 12 and the end cover 10. In this embodiment, a connecting portion between the first housing 11 and the second housing 12 is provided with an annular sealing ring 19. The electronic pump 100 is provided with an partition 13, and the partition 13 separates the pump chamber into a wet chamber 20 and a dry chamber 30. Working medium may flow through the wet chamber 20, and the rotor assembly 4 is arranged in the wet chamber 20. No working medium flow through the dry chamber 30, and the stator assembly 15 and the printed circuit board 17 are arranged in the dry chamber 30. The stator assembly 15 is electrically connected to the printed circuit board 17, and the printed circuit board 17 is connected to an external circuit via a socket connector. In this embodiment, the partition 13 and the second housing 12 are integrally injection-molded, and the second housing 12 is formed by injection molding and the shaft 16 is injection as an insert. In this embodiment, the rotor assembly 4 includes a rotor and an impeller, and the electronic pump 100 is an outer rotor type electronic pump, and the outer rotor type electronic pump refers to a pump taking the shaft 16 as a center, and the rotor of the rotor assembly 4 is located at an outer of the stator assembly 15, i.e., the rotor is arranged around the outer of the stator assembly 15. the electronic pump 100 is applied in an automobile cooling system, the rotor of the rotor assembly is used with the stator assembly, and the rotor is arranged around an outer periphery of the stator assembly.

Figure 2:
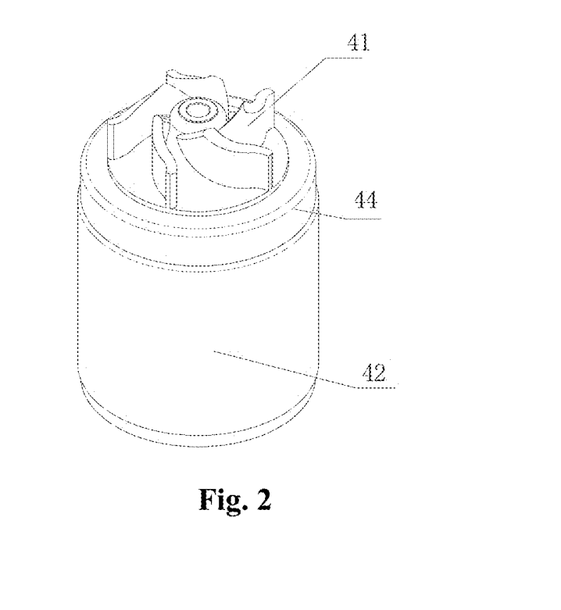
FIG. 2 is a perspective schematic view showing the structure of a rotor assembly of the electronic pump in FIG. 1.

Reference is made to FIG. 2. The rotor assembly 4 in this embodiment is a combined structure. The rotor assembly 4 includes an impeller 41, a rotor 42 and a fixing device 44. The impeller 41 and the rotor 42 are formed separately, and are fixedly connected via the fixing device 44. In this embodiment, the impeller 41 and the rotor 42 are formed by injection-molding, apparently, they may also be formed by other forming processes, for example, casting. The impeller 41 and the rotor 42 are separately formed, and may be made respectively by different materials. The impeller 41 can be made of a common plastic material without magnetism, which may reduce the cost of the material and improve the toughness of the impeller 41. At the same time, a blade of the impeller 41 may be designed to be relatively thin, which facilitates improving the hydraulic performance. The rotor assembly 4 is a combined structure, thus the same rotor 42 may be matched with different impellers 41, and the different impellers 41 may vary the hydraulic performance of the electronic pump 100, which increases the universality of the rotor 42, thus the expense of molds for the rotor assembly may be reduced. The cylindricity and the evenness of the thickness of the wall of the rotor 42, which is separately injection-molded, are also easily ensured. FIGS. 3 to 24 show several specific embodiments of the rotor assembly.

Figure 3:
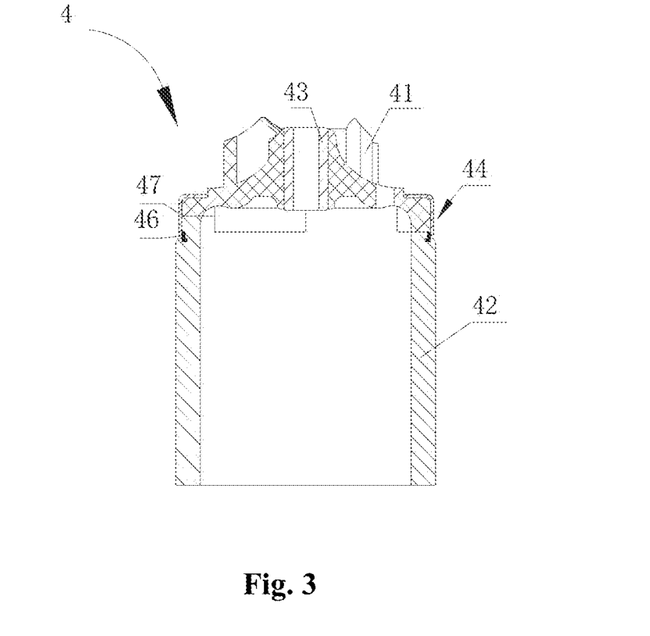
FIG. 3 is a sectional schematic view showing the structure of a first embodiment of the rotor assembly in FIG. 2.

FIGS. 3 to 7 are schematic views showing the structure of a first specific embodiment of the rotor assembly. FIG. 3 is a sectional schematic view showing the structure of a first embodiment of the rotor assembly. The rotor assembly 4 includes an impeller 41, a rotor 42, a shaft sleeve 43, and a fixing device 44. The impeller 41 and the rotor 42 are separately injection-molded and then are fixedly connected by the fixing device 44. The impeller 41 is formed by injection-molding a conventional plastic material and taking the shaft sleeve 43 as an insert. The rotor 42 includes a magnetic material, and the fixing device 44 includes a metal ring 46 and a metal sleeve 47. The metal ring 46 is sleeved on the rotor 42, and the metal sleeve 47 is sleeved on the impeller 41 and is fixed to the metal ring 46 by welding.

Figure 4:
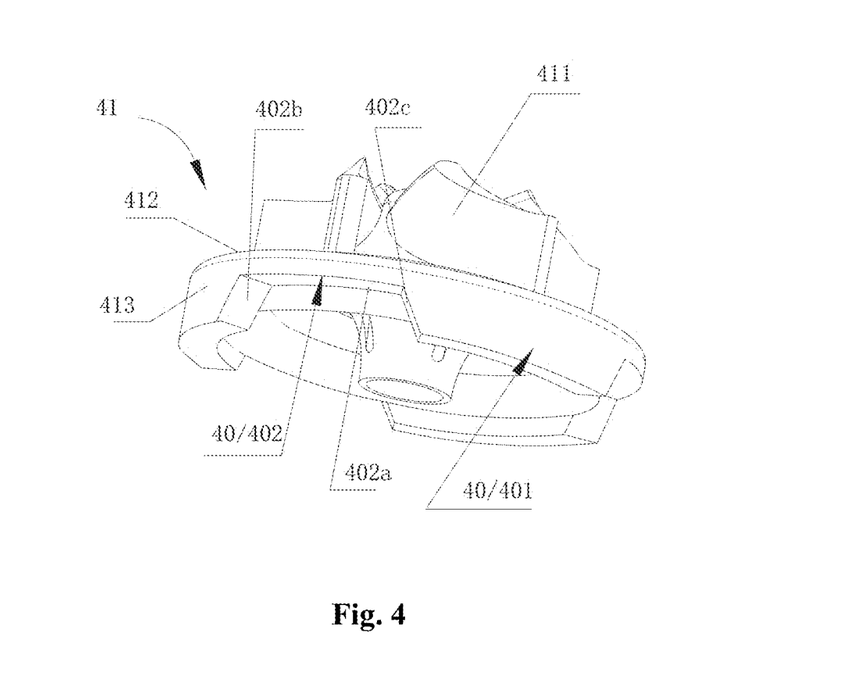
FIG. 4 is a schematic view showing the structure of an impeller of the rotor assembly in FIG. 3.

FIG. 4 is a schematic view showing the structure of the impeller 41 in FIG. 3, and the impeller 41 includes a blade 411, a first connecting portion 412 and a second connecting portion 413. The first connecting portion 412 includes an upper surface of the first connecting portion 412 and a lower surface of the first connecting portion 412. The blade 411 is formed on or is integrally connected to the upper surface of the first connecting portion 412, and the second connecting portion 413 is formed on or integrally connected to the lower surface of the first connecting portion 412. Multiple blades 411 are arranged at uniform intervals or arranged uniformly along a circumference on the upper surface of the first connecting portion 412. The second connecting portion 413 is substantially in an incomplete cylindrical. The second connecting portion 413 includes a fixed portion and a free end. The fixed portion of the second connecting portion 413 is injection-molded and fixed to the first connecting portion 412, and the free end of the second connecting portion 413 includes a first fitting portion 40. The first fitting portion 40 includes a first protrusion 401 and a first sunken portion 402 which are alternately arranged. The first protrusion 401 is in an inverted trapezoidal, and the first sunken portion 402 is in a trapezoidal. The first sunken portion 402 includes a first bottom 402a, a first side 402b, and a second side 402c. An included angle between the first side 402b and the first bottom 402a and an included angle between the second side 402c and the first bottom 402a are greater than 90 degrees, and the two included angles are substantial equal to each other. The first protrusion 401 includes a first top surface 401a. In a circumferential direction of the second connecting portion 413, an arc length of the first top surface 401a is smaller than or equal to an arc length of the first bottom 402a, and an arc length of a opening portion of the first sunken portion 402 is greater than an arc length of the first bottom 402a.

Figure 5:
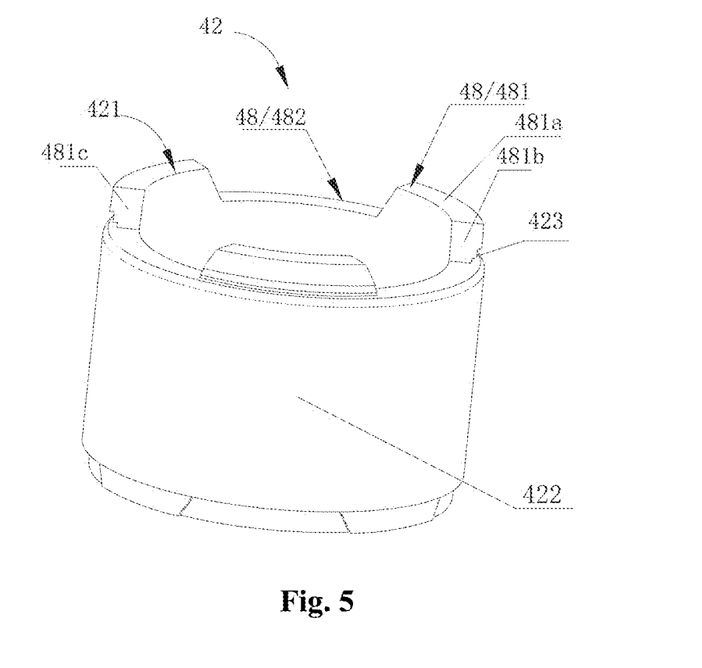
FIG. 5 is a schematic view showing the structure of a rotor of the rotor assembly in FIG. 3.

As shown in FIG. 5, the rotor 42 is substantially in a cylindrical, and the rotor 42 includes an end 421 and a rotor side wall 422. The rotor side wall 422 includes a magnetic material, and the end 421 includes a second fitting portion 48. The second fitting portion 48 includes a second protrusion 481 and a second sunken portion 482 which are alternately arranged. The second protrusion 481 is in a trapezoidal shape, and the second sunken portion 482 is in an inverted trapezoidal shape. The second protrusion 481 includes a second top surface 481a, a third side surface 481b and a fourth side surface 481c. An included angle between the third side surface 481b and the second top surface 481a and an included angle between the fourth side surface 481c and the second top surface 481a are each greater than 90 degrees, and are substantially the same as the included angle between the first side 402b and the first bottom 402a and the included angle between the second side 402c and the first bottom 402a. Reference is made to FIGS. 3, 4, and 5. The impeller 41 and the rotor 42 form a cooperation by cooperating the first fitting portion 40 and the second fitting portion 48, and the first sunken portion 402 of the first fitting portion 40 and the second protrusion 481 of the second fitting portion 48 are engaged with each other, which may increase the contact area of fitting surfaces and improve the effect for resisting a torsion force between the rotor 42 and the impeller 41 at the cooperation. The rotor 42 further includes an annular groove portion 423 having an L-shaped cross section, and the annular groove portion 423 is arranged at a joint between the second protrusion 481 and the rotor side wall 422, which allows an outer diameter of the connecting part to be smaller than an outer diameter of the rotor side wall. The annular groove portion 423 is configured to dispose the metal ring 46, and part of the metal ring 46 is arranged in the annular groove portion 423.

Figure 6:
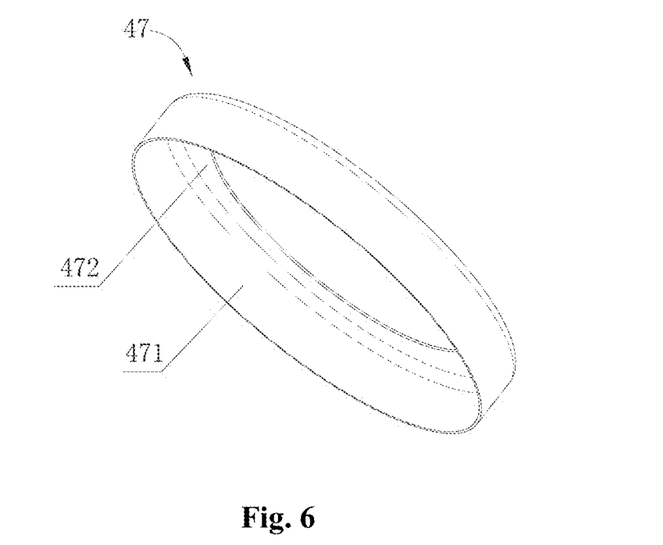
FIG. 6 is a schematic view showing the structure of a metal sleeve of the rotor assembly in FIG. 3.
Figure 7:
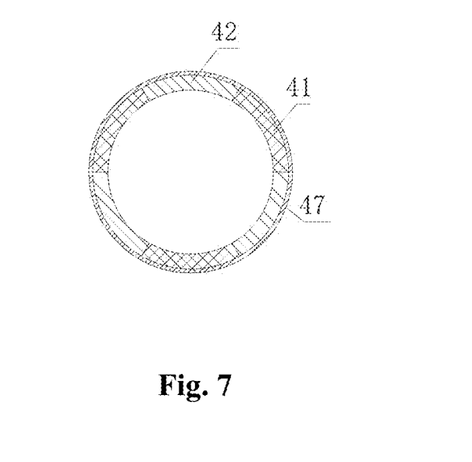
FIG. 7 is a sectional schematic view showing the structure of a cooperation of the rotor assembly in FIG. 3.

Reference is made to FIGS. 3, 6 and 7. The fixing device 44 includes the metal sleeve 47 and the metal ring 46 with an opening, and the fixing device 44 allows the impeller 41 and the rotor 42 to form a fixed integral part. FIG. 6 is a schematic view showing the structure of the metal sleeve 47. In this embodiment, the metal sleeve 47 has an L-shaped cross section, and includes a cylindrical portion 471 and a bottom 472. The metal sleeve 47 is sleeved on parts of the first connecting portion 412 and the second connecting portion 413 of the impeller 41. The cylindrical portion 471 of the metal sleeve 47 covers the cooperation between the impeller 41 and the rotor 42, and the bottom 472 of the metal sleeve 47 covers part of an upper surface of the first connecting portion 412 of the impeller 41. A lower end of the cylindrical portion 471 of the metal sleeve 47 is in contact with the metal ring 46, and the metal sleeve 47 and the metal ring 46 are welded and fixed by laser welding, which further allows the impeller 41 and the rotor 42 to be fixed. Reference is made to FIG. 3, the metal ring 46 is provided with an opening, and the metal ring 46 is a split ring. The metal ring 46 has an L-shaped cross section, part of the metal ring 46 is disposed in the annular groove portion 423, and sleeves part of the rotor 42. In addition, the metal ring 46 may also have no opening, which may be fixed to the rotor as an injection molding insert. In this embodiment, the fixed connection between the impeller 41 and the rotor 42 is achieved by the metal sleeve 47, the metal ring 46, and the welding and fixing there between. The structure is simple, and the fixed connection has a high strength. FIG. 7 is a cross sectional schematic view of the impeller 41, the rotor 42 and the metal sleeve 47 at the cooperation. The first protrusion 401 and the second protrusion 481 are closely cooperated. The metal sleeve 47 closely abuts against outer circumferential surfaces of the first protrusion 401 and the second protrusion 481.

FIGS. 8 to 11 are schematic views showing the structure of a second specific embodiment of the rotor assembly. In this embodiment, the rotor assembly 5 includes an impeller 51 and a rotor 52 and a fixing device.

Figure 9:
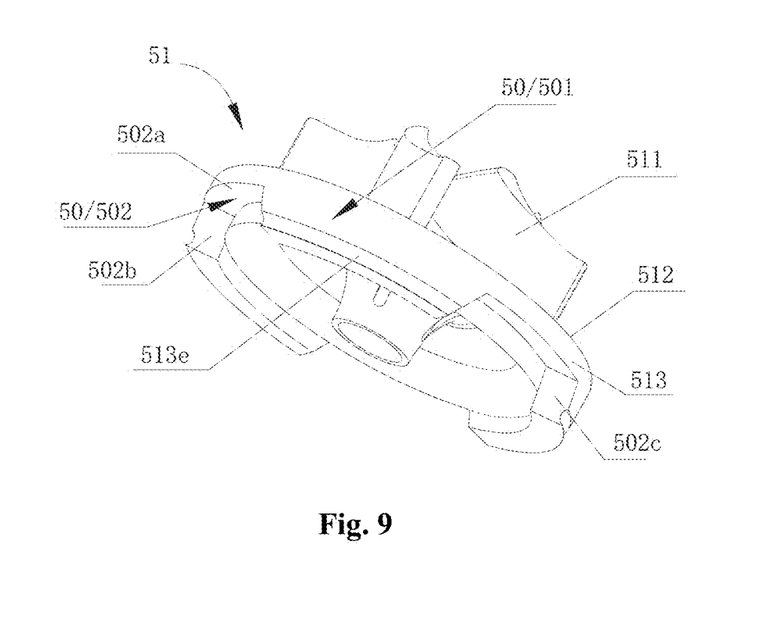
FIG. 9 is a perspective schematic view showing an impeller of the rotor assembly in FIG. 8.

Referring to FIG. 9, the impeller 51 includes a blade 511, a first connecting portion 512 and a second connecting portion 513. The blade 511 is injection-molded and fixed to an upper surface of the first connecting portion 512, and a lower surface of the first connecting portion 512 is injection molded and fixed to the second connecting portion 513. The second connecting portion 513 includes a first fitting portion 50, and the first fitting portion 50 includes a first protrusion 501, a first sunken portion 502 and a first groove 513e. The first groove 513e is close to a free end of the first protrusion 513b, and the first groove 513e is arranged on an outer surface of the second connecting portion 513. The first sunken portion 502 includes a first bottom 502a, a first side 502b, and a second side 502c.

Figure 8:
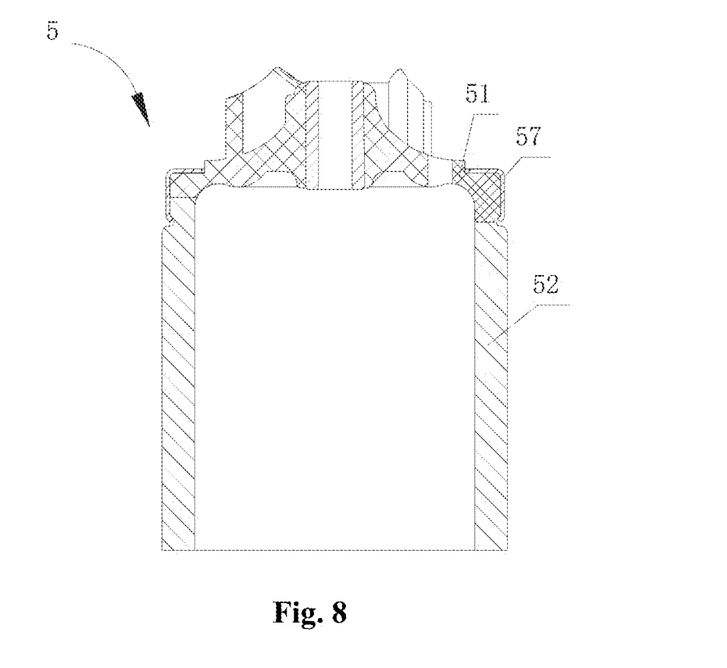
FIG. 8 is a sectional schematic view showing the structure of a second embodiment of the rotor assembly in FIG. 2.
Figure 10:
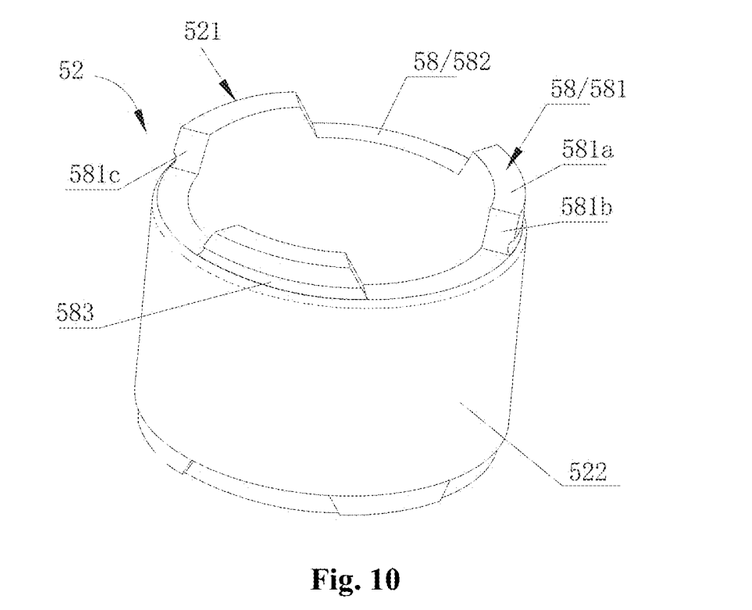
FIG. 10 is a schematic view showing the structure of a rotor of the rotor assembly in FIG. 8.
Figure 11:
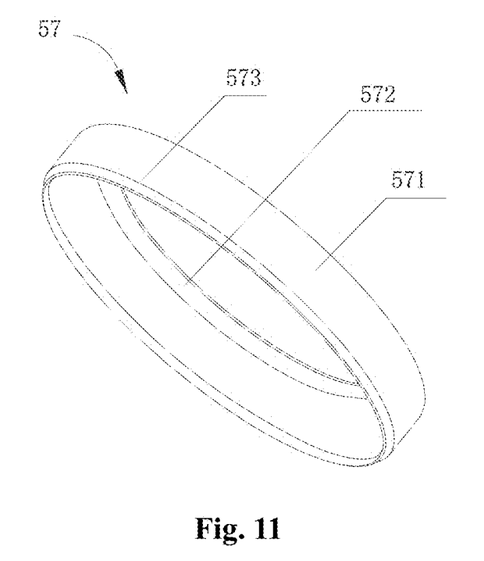
FIG. 11 is a schematic view showing the structure of a neck formed by a metal sleeve of the rotor assembly in FIG. 8 after being connected by pressing.
Figure 12:
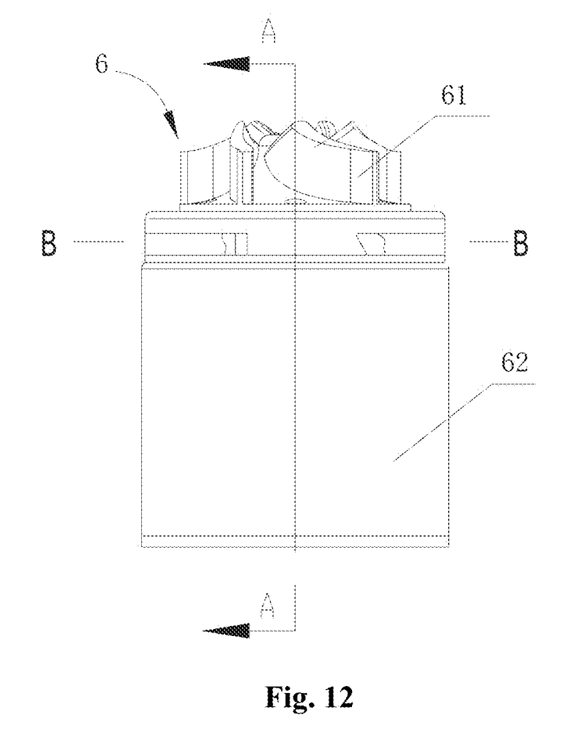
FIG. 12 is a schematic view showing the structure of a third embodiment of the rotor assembly in FIG. 2.
Figure 13:
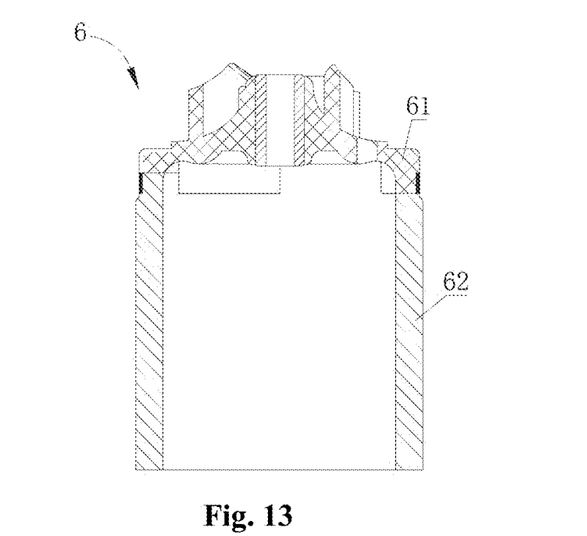
FIG. 13 is a sectional schematic view showing the structure of the rotor assembly in FIG. 12 taken along line A-A.
Figure 14:
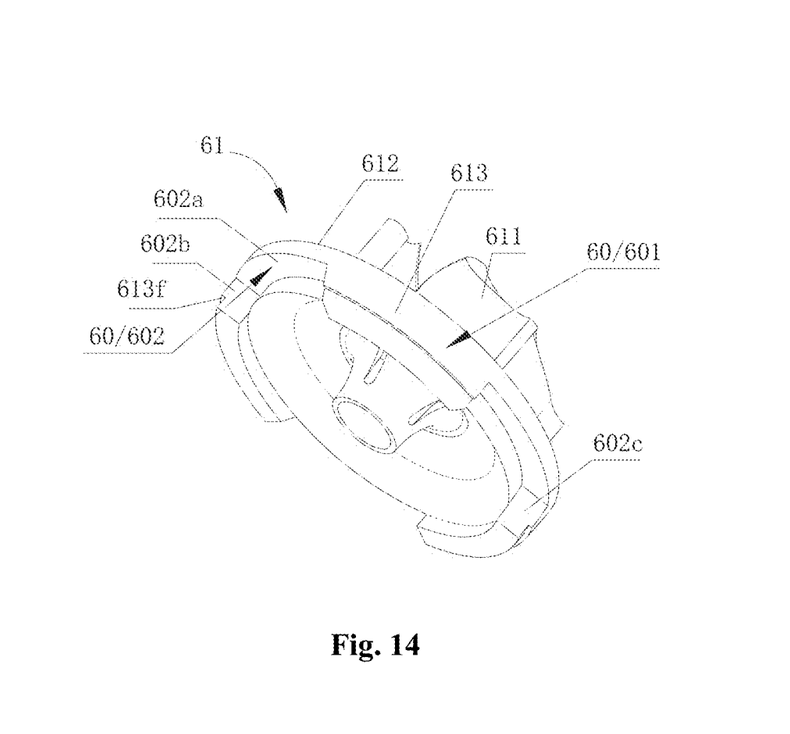
FIG. 14 is a schematic view showing the structure of an impeller of the rotor assembly in FIG. 12.

Referring to FIG. 10, the rotor 52 is substantially in a cylindrical shape. The rotor 52 includes an end 521 and a rotor side wall 522. The rotor side wall 522 includes a magnetic material, and the end 521 includes a second fitting portion 58. The second fitting portion 58 includes a second protrusion 581, a second sunken portion 582 and a second groove 583. The second protrusion 581 is in a trapezoidal, and the second sunken portion 582 is in an inverted trapezoidal. The second groove 583 is formed close to a joint between a root of the second protrusion 581 and the rotor side wall 522. The second groove 583 is formed on an outer surface of the second protrusion 581. The second protrusion 581 includes a second top surface 581a, a third side surface 581b and a fourth side surface 581c. After the first sunken portion 502 and the second protrusion 581 are cooperated, the first groove 513e and the second groove 583 substantially form a complete annular groove portion. The fixing device includes a metal sleeve 57. Referring to FIGS. 11 and 8, the metal sleeve 57 has an inverted L-shaped cross section and includes a cylindrical portion 571 and a bottom 572. The bottom 572 is sleeved on an upper surface of the first connecting portion 521 of the impeller 51. The cylindrical portion 571 of the metal sleeve 51 is sleeved on a cooperation between the impeller 51 and the rotor 52, and the portion of the metal sleeve 57 corresponding to the annular groove portion forms a neck 573 of the metal sleeve 57. In this way, the cooperation between the impeller 51 and the rotor 52 is fixed by the bottom 572 of the metal sleeve 57 and the neck 573, which allows the impeller 51 and the rotor 52 to be fixed. The rotor assembly 5 mainly differs from the rotor assembly 4 of the first embodiment, in that, the rotor assembly 5 does not include a metal ring 46, and does not include the welding and fixing of the metal ring 46 and the metal sleeve 47, and the impeller 51 and the rotor 52 are fixed by the neck 573 formed by the metal sleeve 57, and an annular groove portion is formed in the rotor assembly 5 to receive the neck 573 formed by part of the metal sleeve 57. In this embodiment, the impeller 51 and the rotor 52 are fixedly connected via the metal sleeve and the annular groove portion, which without the metal ring compared with the first embodiment, therefore, the structure is simpler, and the cost is accordingly lowered.

FIGS. 12 to 16 are schematic views showing the structure of a third specific embodiment of the rotor assembly. In this embodiment, the rotor assembly 6 includes an impeller 61, a rotor 62 and a fixing device. The impeller 61 includes a blade 611, a first connecting portion 612, and a second connecting portion 613. The second connecting portion 613 includes a first fitting portion 60, and the first fitting portion 60 includes a first protrusion 601 and a first sunken portion 602. The first protrusion 601 is substantially in a right angle trapezoidal, the first sunken portion 602 is substantially in a right angle trapezoidal. In a circumferential direction of the second connecting portion 613, an arc length of a free end of the first protrusion 601 is smaller than an arc length of a root of the first protrusion 601. The first sunken portion 602 includes a first bottom 602a, a first side 602b, and a second side 602c. An included angle between the first side 602b and the first bottom 602a is substantially 90 degrees, and an included angle between the second side 602c and the first bottom 602a is greater than 90 degrees. The second connecting portion 613 is provided with a first stepped portion 613f, and the first stepped portion 613f is formed on an outer surface of the first protrusion 601. A stepped surface of the first stepped portion 613f extends from the free end of the first protrusion 601 to the root of the first protrusion 601.

Figure 15:
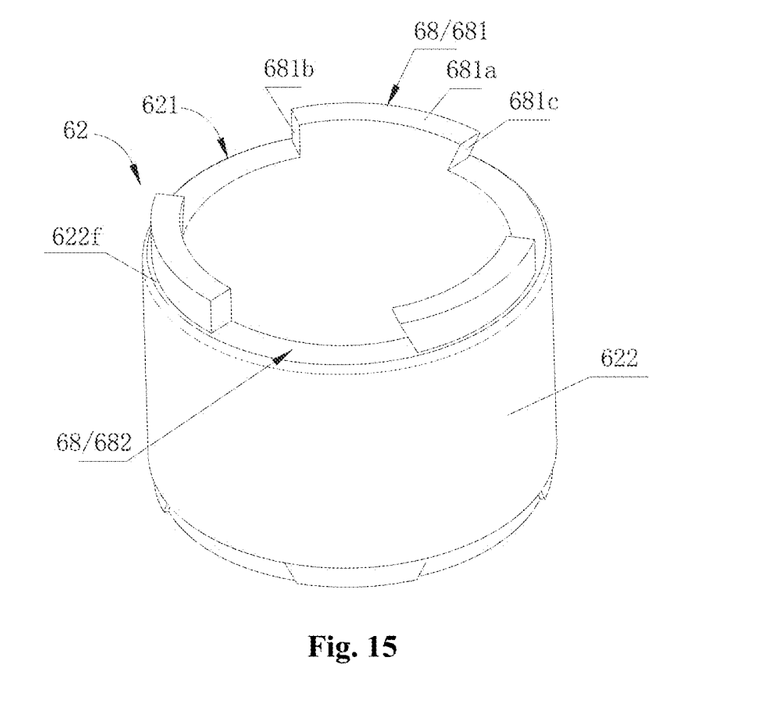
FIG. 15 is a schematic view showing the structure of a rotor of the rotor assembly in FIG. 12.
Figure 16:
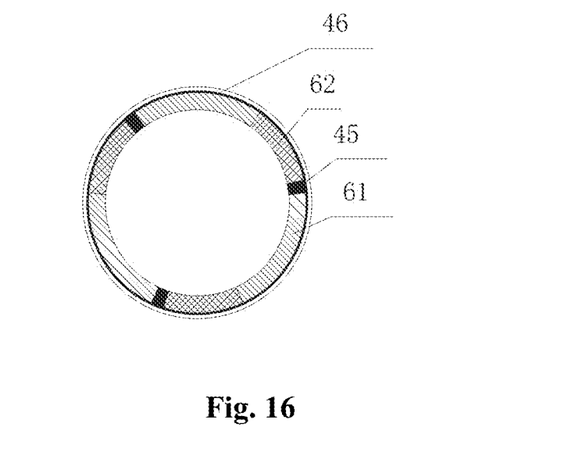
FIG. 16 is a sectional schematic view showing the structure of the rotor assembly in FIG. 12 taken along line B-B.

Referring to FIG. 15, the rotor 62 includes a rotor side wall 622 and an end 621. The end 621 includes a second fitting portion 68. The second fitting portion 68 includes a second protrusion 681 and a second sunken portion 682. The second protrusion 681 is in a right angle trapezoidal. In a circumferential direction of the end 621, an arc length of a free end of the second protrusion 681 is greater than an arc length of a root of the second protrusion 681. In a radial direction of the rotor assembly 6, the thickness of the second protrusion 681 is substantially the same as the thickness of the rotor side wall 622. The second protrusion 681 includes a second top surface 681a, a third surface 681b, and a fourth surface 681c. An included angle between the third surface 681b and the second top surface 681a is substantially 90 degrees, and an included angle between the fourth surface 681c and the second top surface 681a is smaller than 90 degrees. A second stepped portion 622f is formed on the second protrusion 681, and the second stepped portion 622f is formed on an outer surface of the second protrusion 681. A stepped surface of the second stepped portion 622f extends to the root of the second protrusion 681 from the free end of the second protrusion 681. In this embodiment, in a circumferential direction of the end 621, an arc length of the first sunken portion 602 is greater than an arc length of the second protrusion 681, the first sunken portion 602 is substantially in a trapezoidal, and an arc length of the second sunken portion 682 is greater than an arc length of the first protrusion 601. In this way, when the rotor assembly 6 rotates, at least the second surface 681c of the second protrusion 681 is in contact with the second side 602c of the first sunken portion 602, and a certain clearance is formed between the first surface 681b of the second protrusion 681 and the first side 602b of the first sunken portion 602. Or, the first surface 681b of the second protrusion 681 is in contact with the first side 602b of the first sunken portion 602, and a certain clearance is formed between the second surface 681c of the second protrusion 681 and the second side 602c of the first sunken portion 602. An adhesive, for example, epoxy, may be filled in the clearance of the cooperation between the impeller 41 and the rotor 42, and the epoxy is injected and solidified to form an epoxy block 45, and an epoxy layer 46 is formed outside of the cooperation to coat the cooperation. The epoxy layer 46 coats outer circumferential surfaces of the first stepped portion 613f and the second stepped portion 622f, as shown in FIG. 16. This embodiment mainly differs from the first embodiment in that: the rotor assembly 6 does not include the metal sleeve and the metal ring, and the fixing device includes the epoxy block 45 and the epoxy layer 46, and the fixed connection of the impeller 61 and the rotor 62 is formed by injection molding via the epoxy material. In this way, the impeller 61 and the rotor 62 are fixed by the adhesive and coating the epoxy layer 46 on the cooperation allows the fixing to be more reliable, which not only ensures the performances of the impeller 61 and the rotor 62 which are separately formed, but also ensures the fixing of the impeller 61 and the rotor 62. In addition, the fixing device in this embodiment may also be made of a plastic material, and a plastic block is formed by injection-molding via the plastic material, and the plastic block has a size corresponding to the size of the clearance, and then the assembled impeller and the rotor are fixed by injection-molding via the plastic block.

Figure 17:
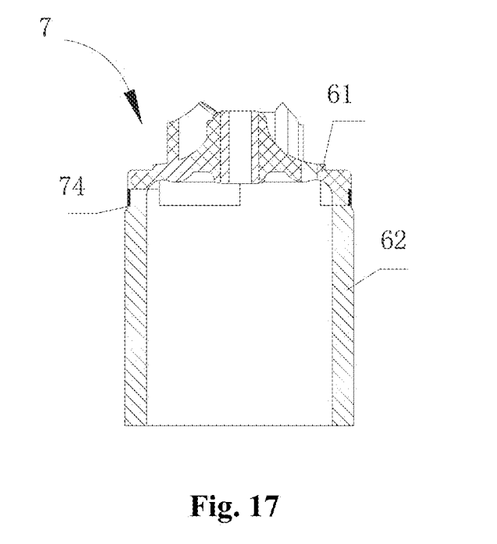
FIG. 17 is a sectional schematic view showing the structure of a fourth embodiment of the rotor assembly in FIG. 2.
Figure 18:
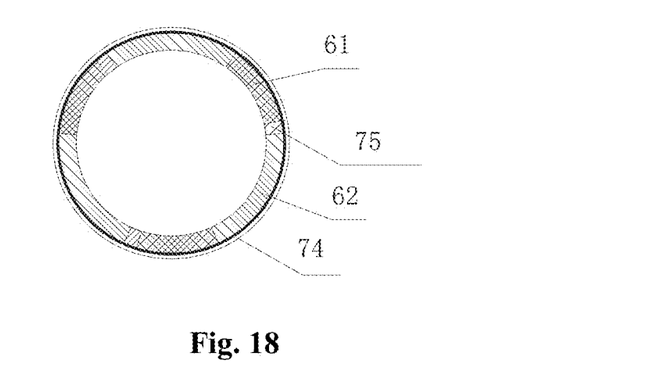
FIG. 18 is a sectional schematic view showing the structure of a cooperation of the rotor assembly in FIG. 17.
Figure 19:
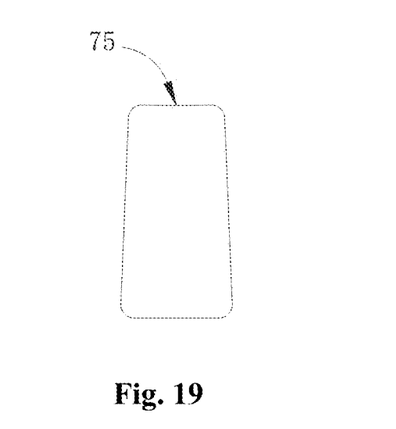
FIG. 19 is a schematic view showing the structure of a wedge of the rotor assembly in FIG. 17.
Figure 20:
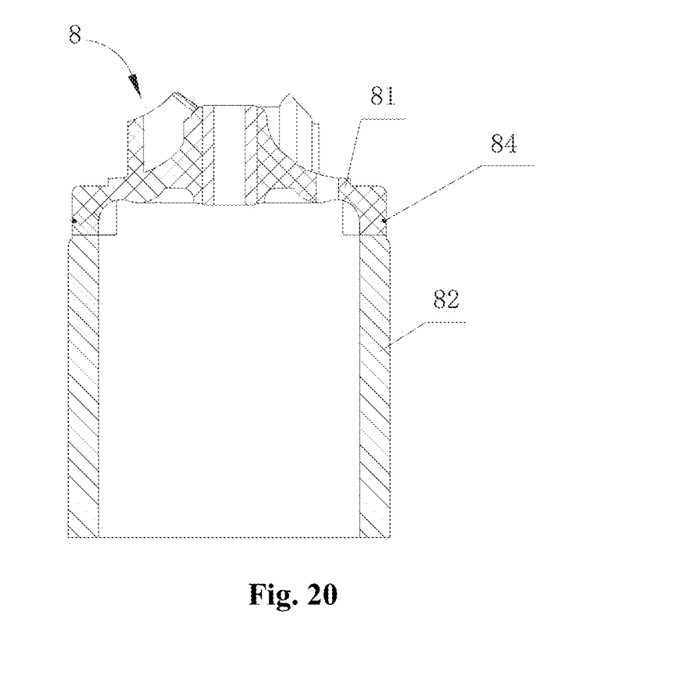
FIG. 20 is a sectional schematic view showing the structure of a fifth embodiment of the rotor assembly in FIG. 2.
Figure 21:
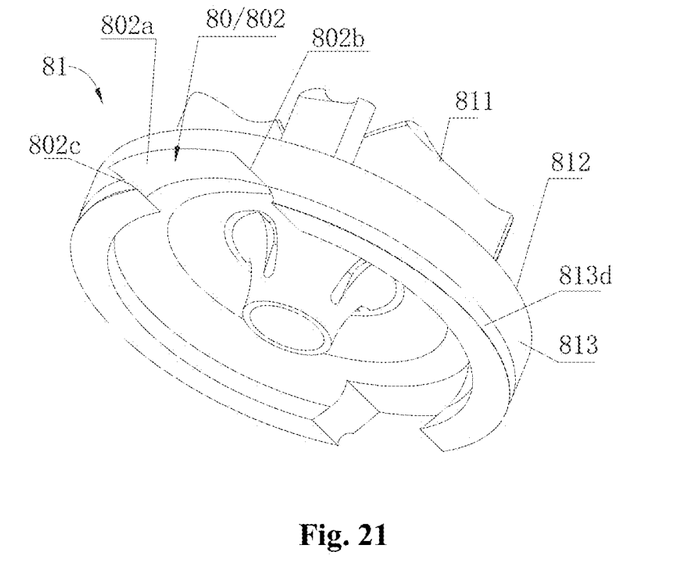
FIG. 21 is a schematic view showing the structure of an impeller of the rotor assembly in FIG. 20.
Figure 22:
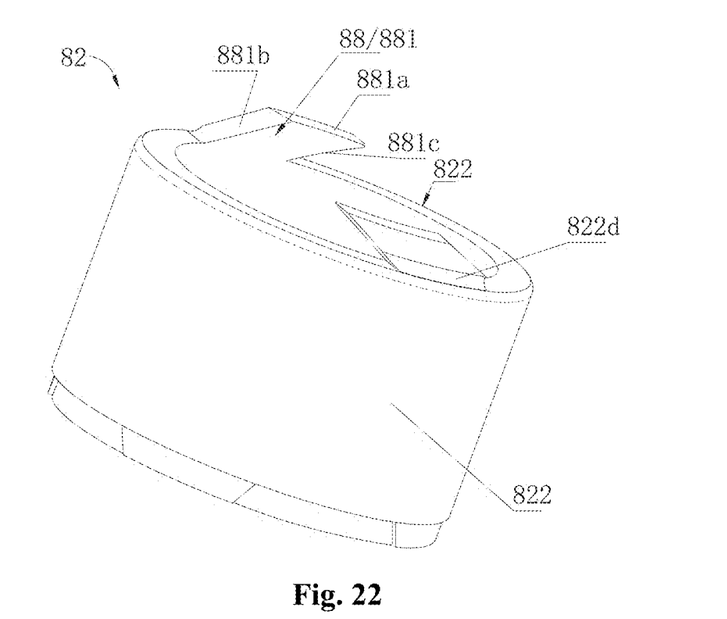
FIG. 22 is a schematic view showing the structure of a rotor of the rotor assembly in FIG. 20.
Figure 23:
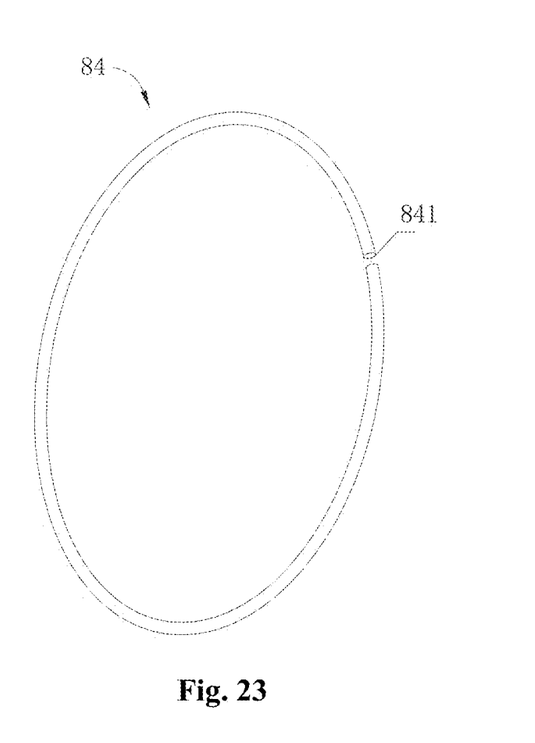
FIG. 23 is a schematic view showing the structure of a metal ring of the rotor assembly in FIG. 20.
Figure 24:
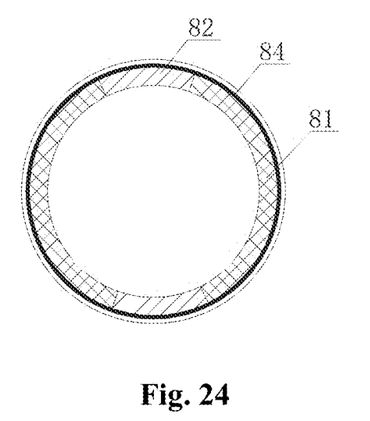
FIG. 24 is a sectional schematic view showing the structure of a cooperation of the rotor assembly in FIG. 20.

FIGS. 17 to 19 show a fourth embodiment of the rotor assembly. In this embodiment, the rotor assembly 7 includes an impeller 61, a rotor 62 and a fixing device. The fixing device includes a wedge 75 and a metal sleeve 74. This embodiment mainly differs from the third embodiment in that: in this embodiment, a clearance is formed between the impeller 61 and the rotor 62, and the wedge 75 is inserted into the clearance. An outer shape of the wedge 75 is substantially the same as a shape of the clearance, and the outer dimension of the wedge 75 is substantially the same as the outer dimension of the clearance, or is slightly greater than the outer dimension of the clearance, thus, when the wedge 75 is inserted into the clearance, the adjacent first surface and the first side are extruded, which allows the second side of the impeller 61 to closely contact with the second surface of the rotor 62, or extrude the adjacent second side and second surface. The first side is in close contact with the first surface, and the outer circumference of the cooperation between the impeller 61 and the rotor 62 are fixed by the metal sleeve 74 with an opening, and the opening of the metal sleeve 74 is fixed by welding. In this way, the structure of the wedge 75 allows the impeller 61 and the rotor 62 to abut against each other more closely and to be fixed by the metal sleeve, thus the structure is more compact.

FIGS. 20 to 24 are schematic views showing the structure of a fifth specific embodiment of the rotor assembly. In this embodiment, the rotor assembly 8 includes an impeller 81, a rotor 82 and a fixing device. The fixing device includes a resilient ring 84. The impeller 81 includes a blade 811, a first connecting portion 812, a second connecting portion 813. The second connecting portion 813 includes a first fitting portion 80, and the first fitting portion 80 includes a first sunken portion 802. The first sunken portion 802 is formed at a lower end of the second connecting portion 813. The first sunken portion 802 includes a first bottom 802a, a first side 802b, and a second side 802c. The first side 802b and the second side 802c are arranged to be substantially parallel to each other. An included angle between the first side 802b and the first bottom 802a is greater than 90 degrees, and an included angle between the second side 802c and the first bottom 802a is smaller than 90 degrees. The second connecting portion 813 is provided with a first groove 813d, and the first groove 813d is formed close to a free end of the second connecting portion 813. The rotor 82 includes an end 821 and a rotor side wall 822. The end 821 includes a second fitting portion 88. The second fitting portion 88 includes a second protrusion 881, and the second protrusion 881 includes a second top face 881a, a third surface 881b, and a fourth surface 881c. The third surface 881b and the fourth surface 881c are arranged substantially parallel to each other. An included angle between the third surface 881b and the second top surface 881a is greater than 90 degrees, and an included angle between the fourth surface 881c and the second top surface 881a is smaller than 90 degrees. A second groove 822d is formed close to the end 821 of the connecting part of the root of the second protrusion 881 and the rotor side wall 822. In this embodiment, the fixing device includes a resilient metal ring 84. The resilient metal ring 84 is a split ring, and the resilient metal ring 84 is formed with an opening portion 841. The second protrusion 881 is revolved into the first sunken portion 802 from an acute angle portion. The first groove 813d and the second groove 822d form a complete annular groove. The resilient metal ring 84 is stuck into the annular groove portion to fix the impeller 81 and the rotor 82. This embodiment mainly differs from the first embodiment in that: the first fitting portion includes the first sunken portion 802 formed on the second connecting portion 813 of the impeller 81, and the second fitting portion includes a second protrusion 881 formed on the rotor 82, and the second protrusion 881 is restricted with the first sunken portion 802 by being revolved into or translational motion into the first sunken portion 802. The impeller 81 and the rotor 82 are fixed by the resilient metal ring 84, and two ends of the opening portion of the resilient metal ring 84 are fixedly connected by welding.

In the above embodiments, the direction terms such as "upper", "lower" are only for ease of description, and the "upper" and "lower" directions are not necessarily the directions in an installed state of the electronic pump 100, which will not limit the direction for using the electronic pump 100.

It should be noted that, the above embodiments are only intended for describing the present application, and should not be interpreted as limitation to the technical solutions of the present application. Although the present application is described in detail in conjunction with the above embodiments, it should be understood by the skilled in the art that, modifications or equivalent substitutions may still be made to the present application by those skilled in the art; and any technical solutions and improvements thereof without departing from the spirit and scope of the present application also fall into the scope of the present application defined by the claims.

The invention claimed is:

1. An electronic pump, comprising a first housing, a second housing, a rotor assembly, a stator assembly, a shaft and a printed circuit board, a pump chamber comprising a space between the first housing and the second housing, wherein the electronic pump further comprises an partition, and the partition separates the pump chamber into a wet chamber and a dry chamber, the rotor assembly is arranged in the wet chamber, and the stator assembly and the printed circuit board are arranged in the dry chamber, wherein the rotor assembly comprises an impeller, a rotor and a fixing device, the impeller and the rotor are separately formed, the material of the impeller comprises no magnetic material, and the material of the rotor comprises a magnetic material, and the impeller and the rotor are fixed with respect to each other by the fixing device, the impeller comprises blades, a first connecting portion and a second connecting portion, and the blade, the first connecting portion and the second connecting portion are integrated, and the rotor comprises an end and a rotor side wall, the end is arranged at an end of the rotor side wall, the second connecting portion of the impeller comprises a first fitting portion, the end of the rotor comprises a second fitting portion, the impeller and the rotor are cooperated by the first fitting portion and the second fitting portion, and a cooperation of the rotor assembly includes the first fitting portion and the second fitting portion, and the impeller and the rotor are fixedly connected with each other through the fixing device and the cooperation, wherein the blade extends from one surface of the first connecting portion, and the second connecting portion extends from the other surface of the first connecting portion, the extending directions of the blade and the second connecting portion are opposite to each other, the first fitting portion comprises a first sunken portion or a first protrusion, the sunken portion formed from a free end of the second connecting portion to an inside of a body of the second connecting portion, the first protrusion protruding from an end of the second connecting portion; the second fitting portion comprises a second protrusion protruding or a second sunken portion, the second protrusion protruding from the rotor side wall, the second sunken portion formed from a free end of the end to an inside of a body of the rotor, the cooperation comprises the first sunken portion and the second protrusion, or the first protrusion and the second sunken portion, wherein the second protrusion comprises a top surface, a first surface and a second surface, and an included angle between the first surface and the top surface is substantially 90 degrees, and an included angle between the second surface and the top surface is greater than 90 degrees, the first sunken portion comprises a bottom, a first side and a second side, and an included angle between the first side and the bottom is substantially 90 degrees, and an included angle between the second side and the bottom is greater than 90 degrees, in the case that the rotor assembly is operated, the second surface is in surface contact with the second side, and the first surface and the first side are spaced apart by a certain distance to form a clearance, or the first surface is in contact with the first side, and the second surface and the second side are spaced apart by a certain distance to form a clearance.

2. The electronic pump according to claim 1, wherein the fixing device comprises an adhesive block formed by an adhesive, and the adhesive have the impeller and the rotor fixedly connected after the adhesive is solidified.

3. The electronic pump according to claim 2, wherein the clearance is filled with the adhesive, the material of the adhesive includes epoxy.

4. The electronic pump according to claim 2, wherein the fixing device further comprises a coating layer, and the adhesive forms the coating layer coating an outer surface of the cooperation at least at the outer surface of the cooperation of the rotor assembly.

5. The electronic pump according to claim 3, wherein the fixing device further comprises a coating layer, and the adhesive forms the coating layer coating an outer surface of the cooperation at least at the outer surface of the cooperation of the rotor assembly.

6. The electronic pump according to claim 1, wherein the fixing device comprises a wedge, and the wedge is pressed into the clearance from an outer surface of the rotor side wall, two surfaces of the wedged portion are respectively in contact with the first surface and the first side, the second surface and the second side are in surface contact; or the two surfaces of the wedged portion are respectively in contact with the second surface and the second side, the first surface and the first side are in surface contact.

7. The electronic pump according to claim 1, wherein the fixing device comprises a metal ring, and the metal ring comprises an opening portion, the metal ring is sleeved on the cooperation of the rotor assembly, and is partly arranged into an annular groove formed in the cooperation, and two ends of the opening portion are connected by welding.

8. The electronic pump according to claim 6, wherein the fixing device comprises a metal ring, and the metal ring comprises an opening portion, the metal ring is sleeved on an outer circumferential surface of the cooperation, the metal sleeve is arranged into an annular groove portion formed in the cooperation, and two ends of the opening portion are connected by welding.

9. The electronic pump according to claim 1, wherein the electronic pump is applied in an automobile cooling system, the rotor of the rotor assembly is used with the stator assembly, and the rotor is arranged around an outer periphery of the stator assembly.

10. The electronic pump according to claim 1, wherein the cooperation comprises the first sunken portion and the second protrusion, a circumferential direction of the second connecting portion, the ratio of an arc length of the first sunken portion to an circumference of the second connecting portion is smaller than or equal to ½, and the ratio of an arc length of the second protrusion to an circumference of the second connecting portion is smaller than or equal to ½.

11. The electronic pump according to claim 10, wherein the first fitting portion comprises a sunken portion formed on the impeller and alternately arranged, the second fitting portion comprises protrusions formed on the end of the rotor; and the protrusion is restricted with the sunken portion by being revolved into or by being translational motion into the sunken portion.

12. The electronic pump according to claim 11, wherein the impeller and the rotor are separately formed by injection-molding, the impeller is formed by injection molding of a plastic material without a magnetic material, and the rotor is formed by injection-molding of a mixed material including a magnetic material and a plastic material.

* * * * *